Figure 1:
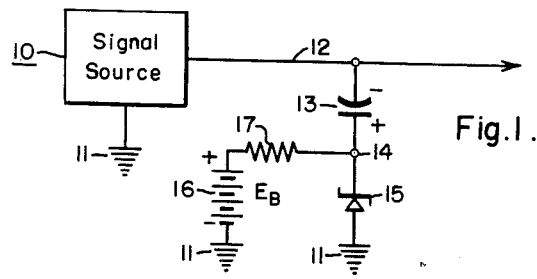

July 11, 1961  J. SUAREZ  2,992,371
CIRCUIT FOR BIASING ELECTROLYTIC CAPACITORS
Filed Oct. 4, 1957

WITNESSES:
Bernard R. Gieguey
Leon J. Taja

INVENTOR
Joseph Suarez
BY Maury I. Hull
ATTORNEY

United States Patent Office 2,992,371
Patented July 11, 1961

2,992,371
CIRCUIT FOR BIASING ELECTROLYTIC CAPACITORS

Joseph Suarez, Catonsville, Md., assignor to Westinghouse Electric Corporation, East Pittsburgh, Pa., a corporation of Pennsylvania
Filed Oct. 4, 1957, Ser. No. 688,296
5 Claims. (Cl. 317—231)

This invention relates to improvements in electrical circuits for biasing electrolytic capacitors, and more particularly to a circuit employing a Zener diode for biasing an electrolytic capacitor.

In using transistors in control circuits, it is frequently desirable to include frequency shaping networks having R-C legs. In vacuum tube circuits where high impedance levels can be used, the capacitor used to form a particular R-C product can be small since the resistance value can be high. In transistor circuits, impedance levels are lower and therefore it is usually preferable to use R-C combinations of smaller resistance and higher capacitance values.

Where high values of capacitance are necessary, it is desirable to use electrolytic capacitors because of the high values of capacitance available in a small volume. A problem arises in the use of electrolytic capacitors when the signal is variable in polarity with respect to ground since the electrolytic capacitor is polarized and can sustain only one polarity.

Prior art circuits for biasing electrolytic capacitors to a predetermined voltage level to accommodate signals of varying polarity are characterized by a number of disadvantages. One such prior art circuit employs a resistor string, one form of which includes a resistor connected in parallel with the capacitor. The use of a resistor string for biasing is undesirable, because such a resistor string, or voltage dividing network, unless the resistance values are so small that a relatively large amount of power is dissipated within it, represents an impedance of undesirable large value in series with the capacitor.

This invention provides a biasing circuit which presents a very small series impedance. This is accomplished by employing a Zener diode in series with the electrolytic capacitor, with a biasing potential from a direct current source applied by way of a resistor to the junction between the Zener diode and the capacitor. The direct current potential and value of the resistor are chosen so that the diode breaks down at its Zener voltage point, biasing the capacitor in the proper direction or polarity and at the same time offering a very low impedance to signals.

Accordingly, a primary object of the invention is to provide a new and improved circuit for biasing electrolytic capacitors.

Another object is to provide a new and improved circuit for biasing electrolytic capacitors employing a Zener diode.

Figure 2:
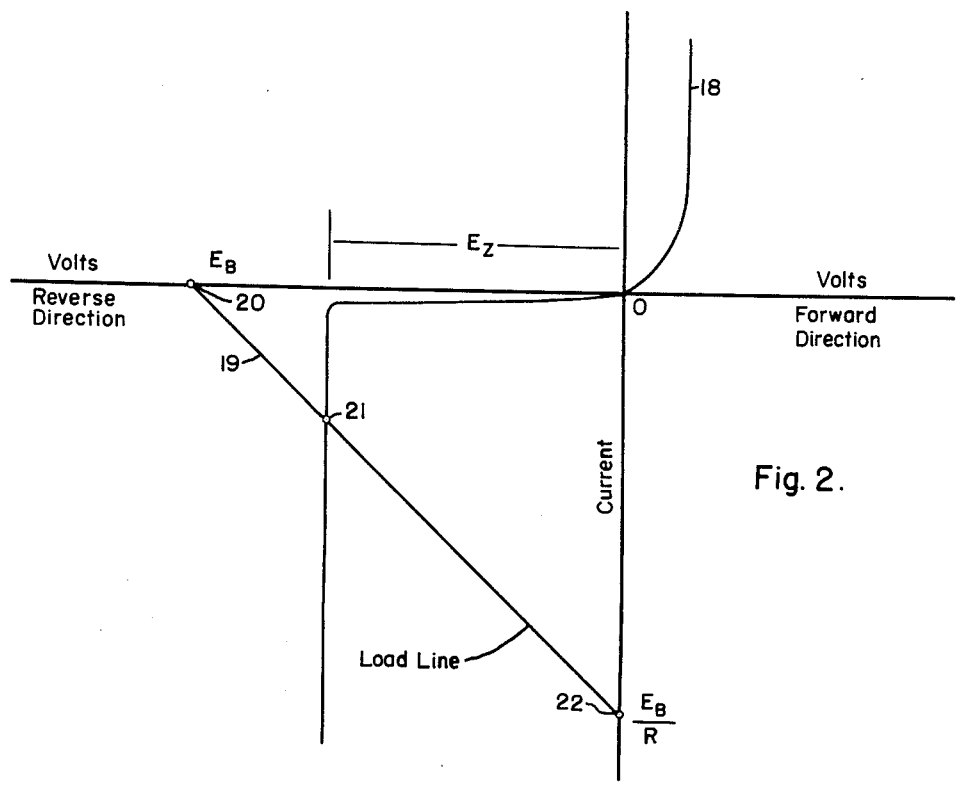

Other objects and advantages will become apparent after a study of the following specification when read in connection with the accompanying drawings, in which:

FIGURE 1 is a schematic electrical circuit diagram of a biasing circuit according to the preferred embodiment of the invention; and FIG. 2 is a graph illustrating the operation of the apparatus of FIG. 1.

Particular reference should be made now to the drawings for a more complete understanding of the invention. The reference numeral 10, FIG. 1, generally designates a suitable signal source which may be of the alternating current variety, and the source 10 may have any desired internal impedance. The signal developed by 10 is applied between ground 11 and lead 12 which is connected to one terminal, in this case, the negative terminal of an electrolytic capacitor 13. The positive terminal of the electrolytic capacitor 13 is connected by way of lead 14 to one terminal of a Zener diode 15, and the other terminal of the Zener diode 15 is connected to ground 11. A battery or other suitable source of direct current potential 16 is provided, the negative terminal of the battery 16 being connected to ground 11 and the positive terminal of the battery 16 being connected by way of resistor 17 to the aforementioned lead 14.

The aforementioned Zener diode 15, as will be readily understood by those skilled in the art, has an assymmetrical current-voltage characteristic curve when potentials are applied thereto in forward and reverse directions. In the forward direction, over at least a portion of the curve, current conduction is a function of the applied voltage, although the function is not necessarily linear, whereas in the reverse direction a very small current flows until a certain critical voltage is reached, whereupon the diode breaks down and a large current flows, the dynamic impedance of the Zener diode falling to a low value in the breakdown region of the characteristic curve.

In the circuit of the figure, the values of battery 16 and resistor 17 are so chosen that the Zener diode 15 breaks down at a predetermined Zener voltage point. After the diode 15 is broken down, the capacitor 13 is biased in the proper direction with a voltage corresponding to the Zener voltage point, and insofar as signals with respect to ground are concerned, the diode 15 offers a very low impedance. It will be readily understood by those skilled in the art that the sum of the direct current biasing voltage on the capacitor 13 plus the peak value of the alternating current signal from source 10 should not exceed the breakdown voltage of the capacitor. As an example, if the electrolytic capacitor 13 has a breakdown voltage of 20 volts, a maximum alternating current peak signal value of approximately 10 volts can be accommodated, and the Zener diode 15 should have a Zener voltage point of 10 volts. For a fuller discussion of the voltage ratings of electrolytic capacitors reference may be had to "Radio Engineering Handbook," by Keith Henney, McGraw-Hill Book Company, Inc., 4th ed., 1950, pages 175–177.

Particular reference should be made now to FIG. 2. It will be noted that while the Zener diode is operated in the breakdown region, current through the diode can vary over wide limits and the voltage across the diode remains substantially constant.

The curve 18, FIG. 2, represents the voltage-current curve of a typical Zener diode. The aforementioned battery 16 and resistor 17 provide the direct current potential $E_B$ to put the diode in the breakdown region.

The line 19 represents the load line for resistor 17 or R, and the voltage and current intercepts of the load line are respectively $E_B$ or point 20, and $$\frac{E_B}{R}$$

or point 22. The point 21 where the load line intersects the diode characteristic curve is the operating or bias point, and the diode has across it the breakdown or Zener voltage $E_Z$. This voltage is determined by the selection of the diode.

In the breakdown region, because of the diode characteristics, an increase in current through the diode causes little or no change in voltage, i.e., if the point 21 moves up or down on the curve 18, $E_Z$ remains substantially the same. The circuit therefore appears to the capacitor 13 as if the capacitor were biased by a battery of potential $E_Z$.

The equivalent battery $E_Z$ has very low resistance or impedance to alternating current signals, as is the case with a conventional battery.

Any signal alternating current flowing through the capacitor 13 and diode 15 does not cause $E_z$ to change substantially. The signal current flow through the capacitor is therefore effectively shunted to ground through the diode.

The diode 15 may, if desired, be chosen to have a voltage breakdown point corresponding approximately to the voltage rating of the capacitor 13.

A further advantage offered by the circuit is that the capacitor is connected to a very smooth direct current potential having no substantial ripple.

Whereas the invention has been shown and described with respect to an embodiment thereof which gives satisfactory results, it should be understood that changes may be made and equivalents substituted without departing from the spirit and scope of the invention.

I claim as my invention:

1. In an electrical circuit for biasing an electrolytic capacitor, in combination, an electrolytic capacitor to be biased, and biasing means including a Zener diode in series with said capacitor for applying a biasing potential substantially equal to the Zener voltage rating of the diode to said capacitor while at the same time offering a low impedance path to an alternating current signal.

2. In an electrical circuit for biasing an electrolytic capacitor, in combination, an electrolytic capacitor to be biased, Zener diode means operatively connected in series with said capacitor, and direct current potential means operatively connected to said Zener diode means in a manner whereby the potential causes said Zener diode means to break down, said circuit while the diode means is broken down applying a biasing potential to said capacitor substantially equal to the Zener voltage rating of said diode means and offering a low impedance path to alternating current signals applied to the circuit.

3. A circuit for biasing an electrolytic capacitor comprising, in combination, an electrolytic capacitor, lead means operatively connected to one terminal of said capacitor and adapted to have an alternating current signal applied thereto, said signal being developed with respect to a predetermined common point in said circuit, a Zener diode, lead means operatively connecting the other terminal of said electrolytic capacitor and said Zener diode in series to said predetermined common circuit point, a source of direct current potential, said source having one terminal thereof operatively connected to said predetermined common circuit point, and resistor means operatively connecting the other terminal of said source to the junction between said electrolytic capacitor and said Zener diode, said source of direct current potential being of a preselected polarity and having a magnitude at least great enough to cause said Zener diode to break down at its Zener voltage point, said Zener diode after breakdown applying a direct current biasing potential to said electrolytic capacitor substantially equal to the Zener voltage point of the Zener diode.

4. In an alternating current signal circuit, in combination, an electrolytic capacitor, and biasing means including a Zener diode in series with said capacitor for applying a direct current biasing potential substantially equal to the Zener voltage rating of the diode to said capacitor while at the same time offering a low impedance path to the alternating current signal, the sum of the biasing potential and the peak value of the alternating current signal being no greater than the breakdown voltage of the electrolytic capacitor.

5. In an alternating current signal circuit, in combination, an electrolytic capacitor, a Zener diode connected in series with said capacitor, the alternating current signal being applied across the series-connected Zener diode and electrolytic capacitor, and a source of direct current potential of predetermined polarity and amplitude operatively connected to said Zener diode in a manner whereby the direct current potential causes said Zener diode to break down, said circuit while the diode is broken down applying a direct current biasing potential to said capacitor substantially equal to the Zener voltage rating of the Zener diode and offering a low impedance path to said alternating current signal, the sum of the biasing potential applied to the electrolytic capacitor and the peak value of the alternating current signal being no greater than the breakdown voltage of the electrolytic capacitor.

References Cited in the file of this patent

UNITED STATES PATENTS

| | | |
|---|---|---|
| 926,128 | Moscicki | June 29, 1909 |
| 1,439,526 | Mershon | Dec. 19, 1922 |
| 2,673,955 | Lilienfeld | Mar. 30, 1954 |
| 2,803,815 | Wulfsburg | Aug. 20, 1957 |